(12) United States Patent
Folks et al.

(10) Patent No.: US 8,059,373 B2
(45) Date of Patent: Nov. 15, 2011

(54) EMR SENSOR AND TRANSISTOR FORMED ON THE SAME SUBSTRATE

(75) Inventors: Liesl Folks, Campbell, CA (US); Robert E. Fontana, Jr., San Jose, CA (US); Bruce A. Gurney, San Rafael, CA (US); Klaas B. Klaassen, San Jose, CA (US); Stefan Maat, San Jose, CA (US)

(73) Assignee: Hitachi Global Storage Technologies Netherlands, B.V., Amsterdam (NL)

(*) Notice: Subject to any disclaimer, the term of this patent is extended or adjusted under 35 U.S.C. 154(b) by 1398 days.

(21) Appl. No.: 11/549,879

(22) Filed: Oct. 16, 2006

(65) Prior Publication Data
US 2008/0088982 A1 Apr. 17, 2008

(51) Int. Cl.
*G11B 5/33* (2006.01)
(52) U.S. Cl. .................... 360/324; 360/313
(58) Field of Classification Search .......... 360/324, 360/313
See application file for complete search history.

(56) References Cited

U.S. PATENT DOCUMENTS

| | | | |
|---|---|---|---|
| 3,800,193 A | 3/1974 | Ashar et al. | |
| 4,426,765 A | 1/1984 | Shahriary et al. | |
| 5,055,891 A * | 10/1991 | Moll et al. | 257/201 |
| 5,317,190 A | 5/1994 | Fleischman et al. | |
| 5,453,727 A * | 9/1995 | Shibasaki et al. | 338/32 R |
| 5,502,325 A | 3/1996 | Sokolich et al. | |
| 5,530,732 A * | 6/1996 | Takemi | 378/73 |
| 5,545,999 A * | 8/1996 | Mueller et al. | 324/322 |
| 5,580,381 A * | 12/1996 | Yamagata | 117/101 |
| 5,965,283 A | 10/1999 | Solin et al. | |
| 6,048,632 A | 4/2000 | Solin et al. | |
| 6,117,690 A | 9/2000 | Bennett et al. | |
| 6,195,228 B1 | 2/2001 | Bennett et al. | |
| 6,225,196 B1 * | 5/2001 | Yokoyama | 438/482 |
| 6,707,122 B1 | 3/2004 | Hines et al. | |
| 7,061,034 B2 * | 6/2006 | Park et al. | 257/294 |
| 2004/0129087 A1 | 7/2004 | Rowe et al. | |
| 2004/0207035 A1 | 10/2004 | Witcraft et al. | |

FOREIGN PATENT DOCUMENTS

JP 55024405 2/1980
(Continued)

OTHER PUBLICATIONS

J. Brad Boos, et al., "AlSb/InAs HEMT's for Low-Voltage, High Speed Applications", IEEE Transactions on Electron Devices, vol. 45, No. 9, Sep. (1998).

(Continued)

*Primary Examiner* — Daniell L Negron
*Assistant Examiner* — Carlos E Garcia
(74) *Attorney, Agent, or Firm* — Duft Bornsen & Fishman, LLP

(57) ABSTRACT

Magnetic sensing chips and methods of fabricating the magnetic sensing chips are disclosed. A magnetic sensing chip as described herein includes an EMR sensor formed on a substrate from multiple semiconductor layers. One or more of the semiconductor layers form a quantum well comprising a two-dimensional electron gas (2DEG) or hole gas (2DHG). The magnetic sensing chip also includes one or more transistors formed on the substrate from the multiple semiconductor layers. The transistor(s) likewise include a quantum well comprising a 2DEG or 2DHG. The EMR sensor and the transistor(s) are connected by one or more connections so that the transistor(s) amplifies data signals from the EMR sensor.

16 Claims, 8 Drawing Sheets

FOREIGN PATENT DOCUMENTS

| | | |
|---|---|---|
| JP | 58140158 | 8/1983 |
| JP | 63054785 | 3/1988 |
| JP | 2097075 | 4/1990 |
| JP | 2002299599 | 10/2002 |

OTHER PUBLICATIONS

T. Zhou et al., "Extraordinary magnetoresistance in externally shunted van der Pauw plates", Appl. Phys. Lett., vol. 78, No. 5, Jan. 29, 2001, pp. 667 669.

S. A. Solin et al., "Nonmagnetic semiconductors as read-head sensors for ultra-high-density magnetic recording", Appl. Phys. Lett., vol. 80, No. 21, May 27, 2002, pp. 4012-4014.

C.R. Bolognesi et al., entitled "InAs/AlSb heterostructure field-effect transistors using Si-doped InAs/AlSb short period superlattice modulation doping barrier".

J.B. Boos et al., entitled "Ohmic contacts in AlSb/InAs high electron mobility transistors for low voltage operation".

\* cited by examiner

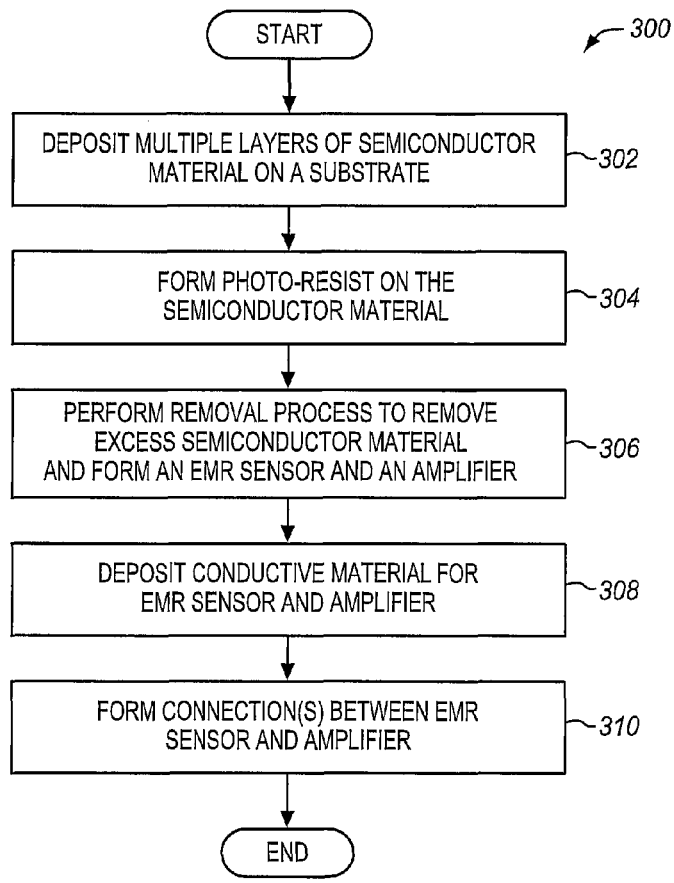
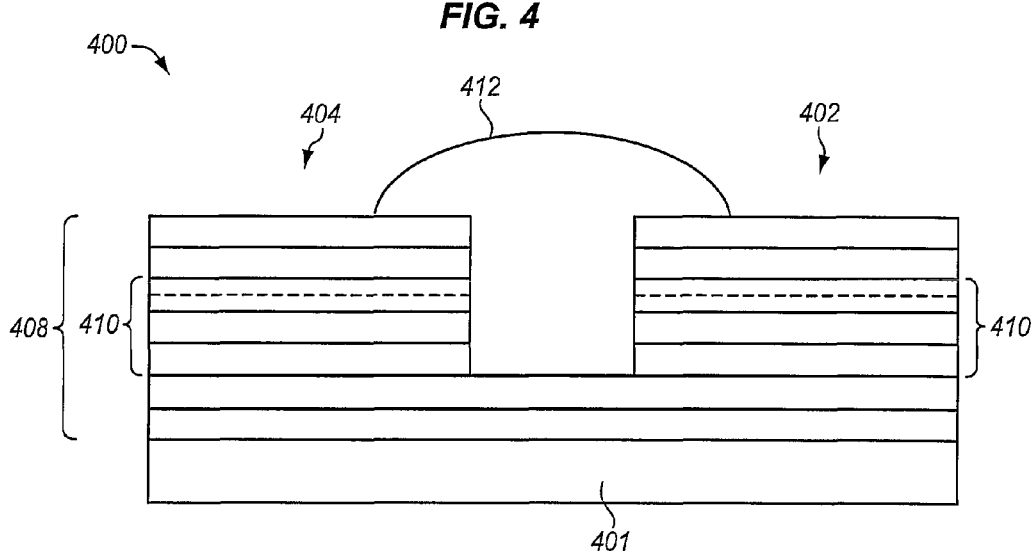

EMR SENSOR AND TRANSISTOR FORMED ON THE SAME SUBSTRATE

BACKGROUND OF THE INVENTION

1. Field of the Invention

The invention is related to the field of magnetic sensing systems and, in particular, to fabricating a magnetic sensing chip having an extraordinary magnetoresistive (EMR) sensor and one or more transistors formed on the same substrate.

2. Statement of the Problem

A magnetoresistive (MR) read element based on extraordinary magnetoresistance (EMR) effect has been proposed for magnetic recording hard disk drives. Read elements based on EMR include an EMR sensor. The advantage of an EMR sensor over conventional giant magnetoresistive (GMR) sensors and tunneling magnetoresistive (TMR) sensors is that EMR is based on the Lorentz force, similar to devices based on the Hall effect. Thus, EMR sensors utilize nonmagnetic semiconducting materials rather than magnetic metals to detect magnetic fields, and therefore EMR sensors do not suffer from the problem of thermal magnetic noise or spin-torque noise.

An EMR sensor includes an EMR structure that is fabricated on a substrate as a mesa comprising a semiconductor heterostructure. A subset of the layers of the semiconductor heterostructure comprises a quantum well structure comprising a two-dimensional (2D) electron or hole gas, which is referred to as the EMR active region. A pair of voltage leads and a pair of current leads are formed on one side surface of the mesa in contact with the active region of the EMR structure, and an electrically conductive metal shunt is formed on an opposing side surface of the mesa in contact with the active region. In the absence of an applied magnetic field, injected current through the current leads passes into the active region and is shunted through the metal. When an applied magnetic field is present, current is deflected from the metal shunt and travels a longer distance through the semiconductor region. Because the semiconductor is much more resistive than the metal shunt, the electrical resistance of the device increases. The change in electrical resistance due to the applied magnetic field is detected across the voltage leads. EMR is described by T. Zhou et al., "Extraordinary magnetoresistance in externally shunted van der Pauw plates", Appl. Phys. Lett., Vol. 78, No. 5, 29 Jan. 2001, pp. 667-669. An EMR sensor for recording head applications is described by S. A. Solin et al., "Nonmagnetic semiconductors as read-head sensors for ultra-high-density magnetic recording", Appl. Phys. Lett., Vol. 80, No. 21, 27 May 2002, pp. 4012-4014.

Presently, EMR sensors are fabricated on a wafer substrate and then cut from the wafer to form individual EMR sensors. The voltage leads of an individual EMR sensor are then typically connected to a signal amplifier circuit to amplify data signals that are sensed by the EMR sensor. One problem with connecting the EMR sensor to the signal amplifier circuit is that the signal amplifier circuit is separately fabricated on a separate chip. The EMR sensor is typically connected to the separate signal amplifier circuit by electrically conductive wires. A capacitance is created between the electrically conductive wires, and the amount of capacitance is a function of the distance between the EMR sensor and the signal amplifier circuit. Additionally, the EMR sensing device typically has a resistance of a few hundred to a few thousand ohms, which is considerably higher than the 50 ohm standard impedance used for propagating high frequency signals. Thus, the capacitance and resistance can unfortunately reduce the signal being propagated to the signal amplifier circuit by RC roll-off because most remote low noise amplifiers require about 50 ohm impedance.

SUMMARY OF THE SOLUTION

The invention solves the above and other related problems by fabricating an EMR sensor and transistor(s) connected in a signal amplifying circuit on the same magnetic sensing chip. The EMR sensor and the transistor(s) may comprise substantially similar or identical heterostructures. For instance, the transistor(s) may be a high electron mobility transistor (HEMT) where a subset of the multilayer structure forms a quantum well comprising a two-dimensional electron gas (2DEG) or hole gas (2DHG). Similarly, the EMR sensor is a multilayer structure where a subset of the multilayer structure forms a quantum well comprising a 2DEG or 2DHG. Thus, the EMR sensor and the transistor(s) may be formed on a common substrate with the same layers in the same deposition steps. Magnetic sensing chips can be fabricated more cost effectively by forming both the EMR sensor and the transistor(s) in the same fabrication steps.

Further, the EMR sensor and the transistor(s) may advantageously be fabricated closer together on the same magnetic sensing chip, which produces a compact design. The close proximity of the EMR sensor and the transistor(s) can also reduce the capacitance between the conductors that connect the EMR sensor to the transistor(s) leading to reduced noise and faster response.

One embodiment of the invention includes a magnetic sensing chip adapted to provide magnetic sensing through extraordinary magnetoresistance (EMR). The magnetic sensing chip includes an EMR sensor formed on a substrate from multiple semiconductor layers. One or more of the semiconductor layers form a quantum well comprising a two-dimensional electron gas (2DEG) or hole gas (2DHG). The magnetic sensing chip also includes one or more transistors formed on the substrate from the multiple semiconductor layers. The transistor(s) likewise includes a quantum well. The EMR sensor and the transistor(s) are connected by one or more connections so that the transistor(s) amplifies data signals from the EMR sensor.

Another embodiment of the invention includes a method of fabricating a magnetic sensing chip adapted to provide magnetic sensing through EMR. The method includes the step of depositing multiple layers of semiconductor material on a substrate. One or more of the layers form a quantum well comprising a 2DEG or 2DHG. The method further includes the step of forming photo-resist on the layers in a pattern to define EMR sensors on the substrate. The method further includes forming photo-resist on the layers in a pattern to define transistors on the substrate. The method further includes performing a removal process to remove the exposed semiconductor material so that the remaining semiconductor material forms EMR sensors and transistors on the substrate. The method may further include connecting one of the EMR sensors to one or more of the transistors so that the transistor(s) amplifies data signals from the EMR sensor.

The invention may include other exemplary embodiments described below.

DESCRIPTION OF THE DRAWINGS

The same reference number represents the same element or same type of element on all drawings.

FIG. 3 is a flow chart illustrating an exemplary method of fabricating magnetic sensing chips.

FIG. 4 is a cross-sectional view of a magnetic sensing chip that includes an EMR sensor and a transistor in an exemplary embodiment of the invention.

DETAILED DESCRIPTION OF THE INVENTION

Figure 1:
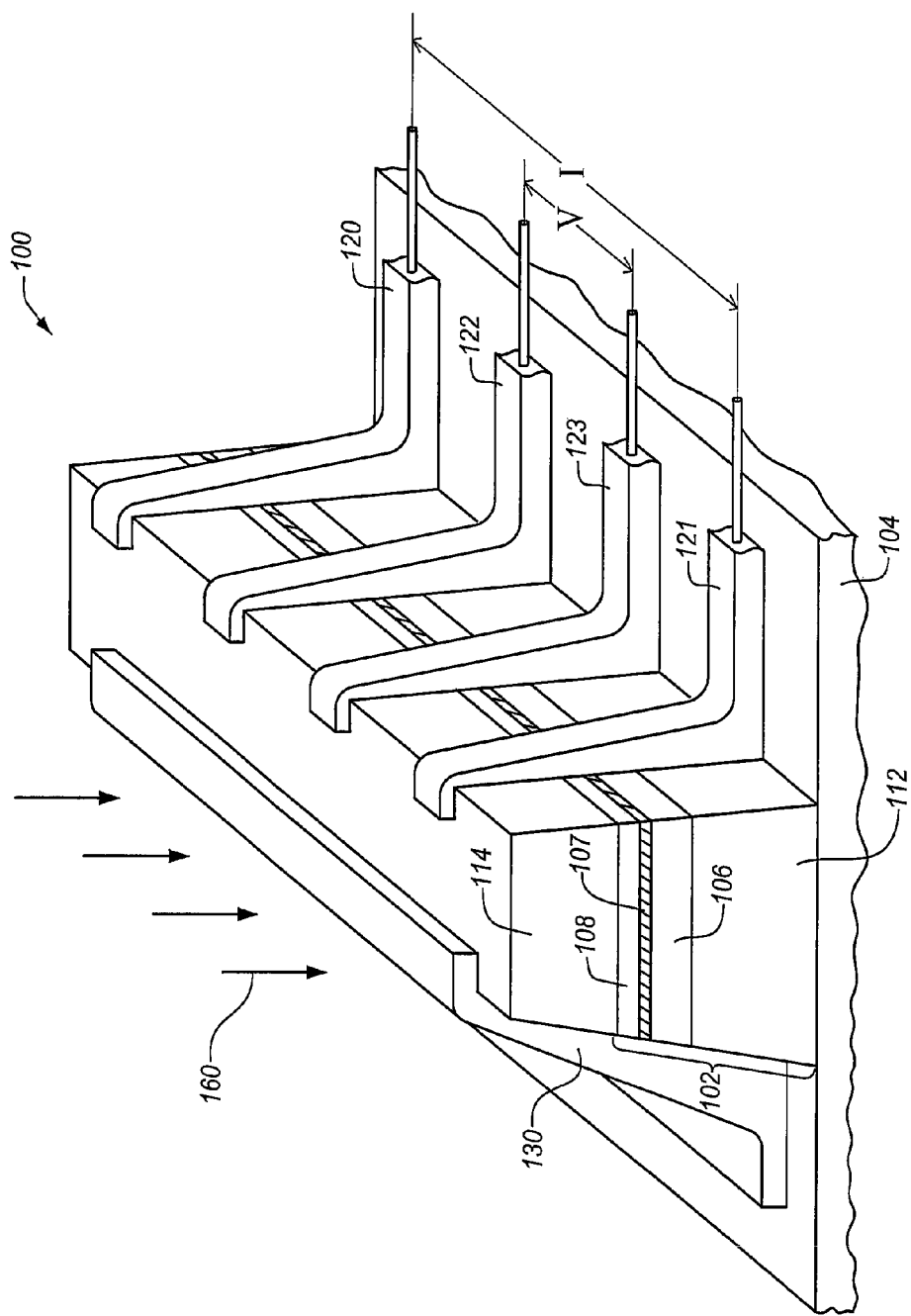
FIG. 1 is an isometric view of an EMR sensor in the prior art.
Figure 2:
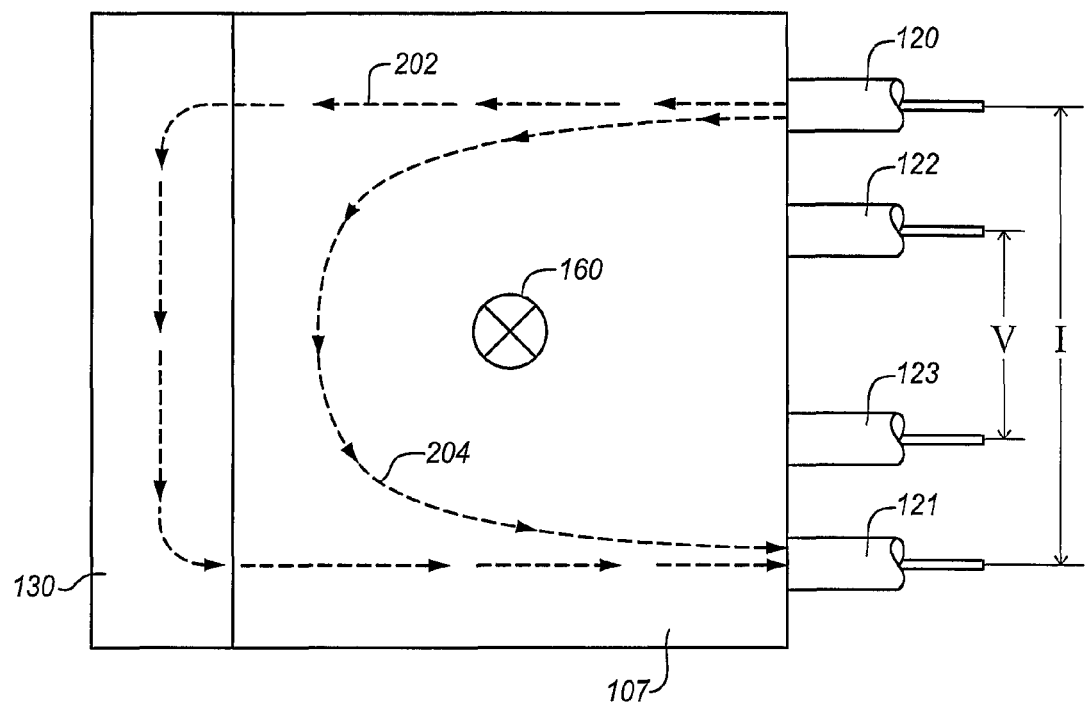
FIG. 2 is a top schematic view of the EMR sensor through a section of the active layer in the prior art.

Description of Prior Art—FIGS. 1-2

FIG. 1 is an isometric view of an EMR sensor 100 in the prior art. The EMR sensor 100 includes an EMR structure 102 that is a III-V heterostructure formed on a semiconducting substrate 104, such as GaAs. EMR sensor 100 may alternatively be formed on a basis of silicon or germanium. The EMR structure 102 is a mesa above substrate 104 that results from a subtractive process, such as reactive ion etching (RIE), ion milling, or wet etching. The EMR structure 102 includes a first barrier layer 106 of semiconducting material having a first band gap, a layer 107 of semiconducting material for the channel formed on top of the first barrier layer 106 and having a second band gap smaller than the first band gap, and a second barrier layer 108 of semiconducting material formed on top of layer 107 and having a third band gap greater than the second band gap. The materials in the first barrier layer 106 and the second barrier layer 108 may be similar or identical. An energetic potential well (quantum well) is created by the functional layers 106-108 due to the different band gaps of the different materials. Thus, carriers can be confined inside the channel layer 107.

The first barrier layer 106 is typically formed on top of a buffer layer 112 that may be one or more layers. The buffer layer 112 comprises several periods of a superlattice structure that function to prevent impurities present in the substrate 104 from migrating into the functional layers 106-108. In addition, the buffer layer 112 is chosen to accommodate the typically different lattice constants of the substrate 104 and the functional layers 106-108 of the EMR structure 102 to thus act as a strain relief layer between the substrate and the functional layers.

One or more doped layers are incorporated into the semiconducting material in the first barrier layer 106, the second barrier layer 108, or both. The doped layers are spaced apart from the boundary of the barrier layer(s) with the channel. The doped layers provide electrons (if n-doped) or holes (if p-doped) to the quantum well. The electrons or holes are concentrated in the quantum well in the form of a two-dimensional electron gas (2DEG) or hole gas (2DHG), respectively.

The functional layers 106-108 may be a heterostructure of AlSb/InAs/AlSb grown onto a semi-insulating GaAs substrate 104 with a buffer layer 112 in between. InAs is a narrow band gap semiconductor. Narrow band gap semiconductors typically exhibit high electron mobility because the effective electron mass is greatly reduced. For example, the room temperature electron mobility of InAs is approximately 35,000 cm$^2$/Vs. InAs has the advantage over other narrow band gap semiconductors like InSb that its Fermi level is pinned above the conduction band at its surfaces. Thus it forms an electron accumulation rather than an electron depletion layer and low ohmic contacts to leads can be realized.

The bottom AlSb layer 106 formed on the buffer layer 112 has a thickness in the range of approximately 1-3 microns and the top AlSb layer 108 has a thickness in the range of approximately 10 to 50 nm. The doping layers incorporated in layer 106 or 108 have a thickness from one monolayer (delta-doped layer) up to 10 nm. The preferred doping is typically n-doping because electrons typically have higher mobility than holes. A typical n-dopant is silicon. The deposition process for the EMR structure 102 may be molecular-beam-epitaxy, but other epitaxial growth methods such as metal-organic chemical vapour deposition (MOCVD) can be used.

A capping layer 114 is formed over the EMR structure 102 to protect the device from corrosion. The capping layer 114 is formed by a non-corrosive semi-insulating semiconductor or insulator.

Two current leads 120-121 and two voltage leads 122-123 are patterned over one side of the mesa of EMR structure 102 so that they make electrical contact with the active region (i.e., the 2DEG or 2DHG confined to the quantum well). A metallic shunt 130 is patterned on the side of the mesa opposite the current and voltage leads 120-123 of the EMR structure 102 so that it makes electrical contact with the active region (i.e., the 2DEG or 2DHG confined to the quantum well). An applied magnetic field 160 (i.e., the magnetic field to be sensed) is shown by the arrows and is normal to the plane of the films in the EMR structure 102. The leads are comprised of metallic materials, such as In, Au, AuGe, or AuSn, to provide an ohmic or low Schottky barrier contact between the lead material and the semiconductor. The leads 120-123 are typically formed after formation of the capping layer 114, and sometimes after removal of some of the capping layer material.

FIG. 2 is a top schematic view of the EMR sensor 100 through a section of active layer 107 in the prior art. FIG. 2 illustrates the basic operation of the EMR sensor 100. In the absence of an applied magnetic field 160, sense current through current leads 120-121 passes into the semiconductor active layer 107 and is shunted through shunt 130, as shown by arrows 202. When an applied magnetic field 160 is present, as shown by the arrow tail into the paper in FIG. 2, current is deflected from shunt 130 and passes primarily through the active layer 107, as shown by arrow 204. The change in electrical resistance due to the applied magnetic field is detected across the voltage leads 122, 123.

Although the pair of voltage leads is shown in between the pair of current leads (IVVI arrangement), it is an advantage to arrange the leads with the voltage leads bridging one of the current leads (IVIV arrangement) to obtain a linear signal. In such an arrangement, the separation of the voltage leads determines magnetic bit resolution.

The EMR sensor 100 described above is difficult to fabricate. The lithography for shunt 130 and the leads 120-123 must be done on a non-planar surface (i.e., the sides of the mesa) so that electrical contact can be made with the exposed edges of the active region. In particular, deposition at an angle through a shadow mask has been employed in the prior art.

The most common approach to fabricating planar ohmic contacts on GaAs or other III-V semiconductors, such as InAs, is to apply an appropriate metallization to the surface of the wafer in a desired pattern and then alloy the metal into the III-V semiconductor by rapid thermal annealing. During the process, a component of the metal enters into the III-V semiconductor and highly dopes the surface layer. Au and Au alloys, such as AuGe or AuSn, are the most common and preferred materials for ohmic contact fabrication on n-type materials. A typical contact resistance area product for an ohmic contact is in the range of 1E-7 to 1E-6 Ohm·cm$^2$. If AuGe is used, it is applied in proportions that represent a eutectic alloy (88% Au and 12% Ge by weight). This eutectic melts at 360° C. and thus any thermal annealing is carried out at temperatures exceeding 360° C. Other elements, such as Ni, may be added to wet the alloy and prevent it from clustering up during the annealing process. Ni is also known to enhance the diffusivity of Ge or other dopants into the III-V semiconductor. The resulting contact after annealing is then an alloy comprising AuGeNi.

The contact metal and wetting layers may be applied by e-beam or thermal evaporation, sputtering, or other common thin film techniques known in the semiconductor industry. Approximately 25-30 nm of Ni are used for every 100 nm of AuGe. The exact thickness of the AuGe is not critical, although 50-250 nm is preferred. Much thinner layers of AuGe will typically result in higher contact resistance. Alloyed AuGeNi generally has poor sheet resistance and thus an extra layer of Au may be added on top of the lead structures to form an AuGeX/Au multilayer with a reduced lead sheet resistance. Instead of an AuGe/Ni/Au multilayer, an AuGe/Ni/Pt/Au multilayer may be employed, where Pt acts as a diffusion barrier for the top Au layer.

Alternatively, a Pd-based metallization scheme may be employed. Pd/Pt/Au multilayers employ the low temperature reactivity of Pd at around 175° C. and use Pt as a diffusion barrier to prevent Au from reacting with semiconductor and lateral diffusion.

Description of Invention—FIGS. 3-13

FIGS. 3-13 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described, but only by the claims and their equivalents.

Fabricating a Magnetic Sensing Chip—FIGS. 3-4

FIGS. 3-4 illustrate the fabrication of a magnetic sensing chip in an exemplary embodiment of the invention. The magnetic sensing chips of the invention may be fabricated according to other methods in other embodiments. FIG. 3 is a flow chart illustrating an exemplary method 300 of fabricating magnetic sensing chips. In step 302, multiple layers of semiconductor material are deposited on a semiconductor substrate, such as GaAs, Si, or Ge. One or more of the semiconductor layers define a quantum well that may comprise a two-dimensional electron gas (2DEG) or hole gas (2DHG). In step 304, photo-resist is formed on the semiconductor layers. The photo-resist is formed to have a pattern that defines an EMR sensor and one or more transistors. Those skilled in the art understand that in wafer fabrication with full film depositions, the photo-resist may be formed to have a pattern that defines multiple EMR sensors and multiple transistors.

In step 306, a removal process, such as ion milling, reactive ion etching (RIE), or wet-etching is performed to remove the excess material not protected by the photo-resist. The remaining material underneath the photo-resist comprises EMR sensors and transistors, such as HEMTs. The EMR sensors and the transistors each include a quantum well. The photo-resist is then removed, such as being dissolved in a solvent.

In step 308, electrically conductive material is deposited for the EMR sensors and the transistors. For instance, an EMR sensor typically includes two current leads, two voltage leads, and a shunt formed from electrically conductive material. Forming the conductive material on an EMR sensor may include the further fabrication steps of depositing a photo-resist, removing portions of the EMR sensor, depositing the electrically conductive material, performing lift-off, and annealing. A transistor typically includes multiple leads formed from electrically conductive material. As an example, a HEMT includes a lead for the gate, a lead for the source, and a lead for the drain. Forming the conductive material on a transistor may include the further fabrication steps of depositing a photo-resist, removing portions of the transistor, depositing the electrically conductive material, performing lift-off, and annealing. Contacts can be ohmic such as for the source and drain or Schottky such as for the gate.

In step 310, one or more connections are formed between one of the EMR sensors and one or more of the transistors. When the EMR sensor is in operation, the EMR sensor will sense magnetic fields and generate a data signal. For instance, if the EMR sensor is implemented in a magnetic disk drive system, then the EMR sensor will sense magnetic transitions on the magnetic disk to generate a data signal. The connections are formed between the EMR sensor and one or more transistors connected in a signal amplifying circuit so that the data signal detected by the EMR sensor is amplified. The transistor(s) thus acts as an amplifier for the EMR sensor.

If method 300 is a wafer-level full film deposition, then individual magnetic sensing chips may be cut from the wafer, where an individual magnetic sensing chip may include an EMR sensor connected to one or more transistors.

FIG. 4 is a cross-sectional view of a magnetic sensing chip 400 that includes an EMR sensor 402 and a transistor 404 in an exemplary embodiment of the invention. Magnetic sensing chip 400 may be formed through the fabrication steps of FIG. 3 or may be formed through other fabrication steps. Magnetic sensing chip 400 includes EMR sensor 402 and transistor 404 that are formed from multiple semiconductor layers 408 on a semiconductor substrate 401. One or more of the semiconductor layers 408 in EMR sensor 402 forms a quantum well 410, such as a 2DEG or 2DHG. Likewise, one or more of the semiconductor layers 408 in transistor 404 forms a quantum well 410, such as a 2DEG or 2DHG. Magnetic sensing chip 400 includes one or more connections 412 between EMR sensor 402 and transistor 404 connected in a signal amplifying circuit so that the data signal detected by EMR sensor 402 is amplified. Connections 412 are illustrated as a line between EMR sensor 402 and transistor 404 to merely show that the connections 412 exist. EMR sensor 402 and transistor 404 may be connected in different ways, such as conductive wires, deposited conductive material, etc.

EMR sensor 402 and transistor 404 may advantageously be fabricated closer together on magnetic sensing chip 400 as compared to prior EMR chips, which produces a compact design. The close proximity of EMR sensor 402 and transistor 404 can also reduce the capacitance between the conductors 412 that connect EMR sensor 402 to transistor 404. Additionally, an amplifier designed with an impedance substantially matched to the resistance of the EMR sensor 402 can be fabricated, resulting in better amplification of the signal. Because the length of the lead connecting EMR sensor 402 and transistor 404 can be made less than a millimeter, the reflections of high frequency signals for frequencies of interest (such as below 10 GHz) will not cause significant degradation of the amplified signal. Magnetic sensing chips may also be fabricated more cost effectively by forming both EMR sensor 402 and transistor 404 in the same fabrication steps.

EMR Sensor/HEMT Example—FIGS. 5-10

Figure 5:
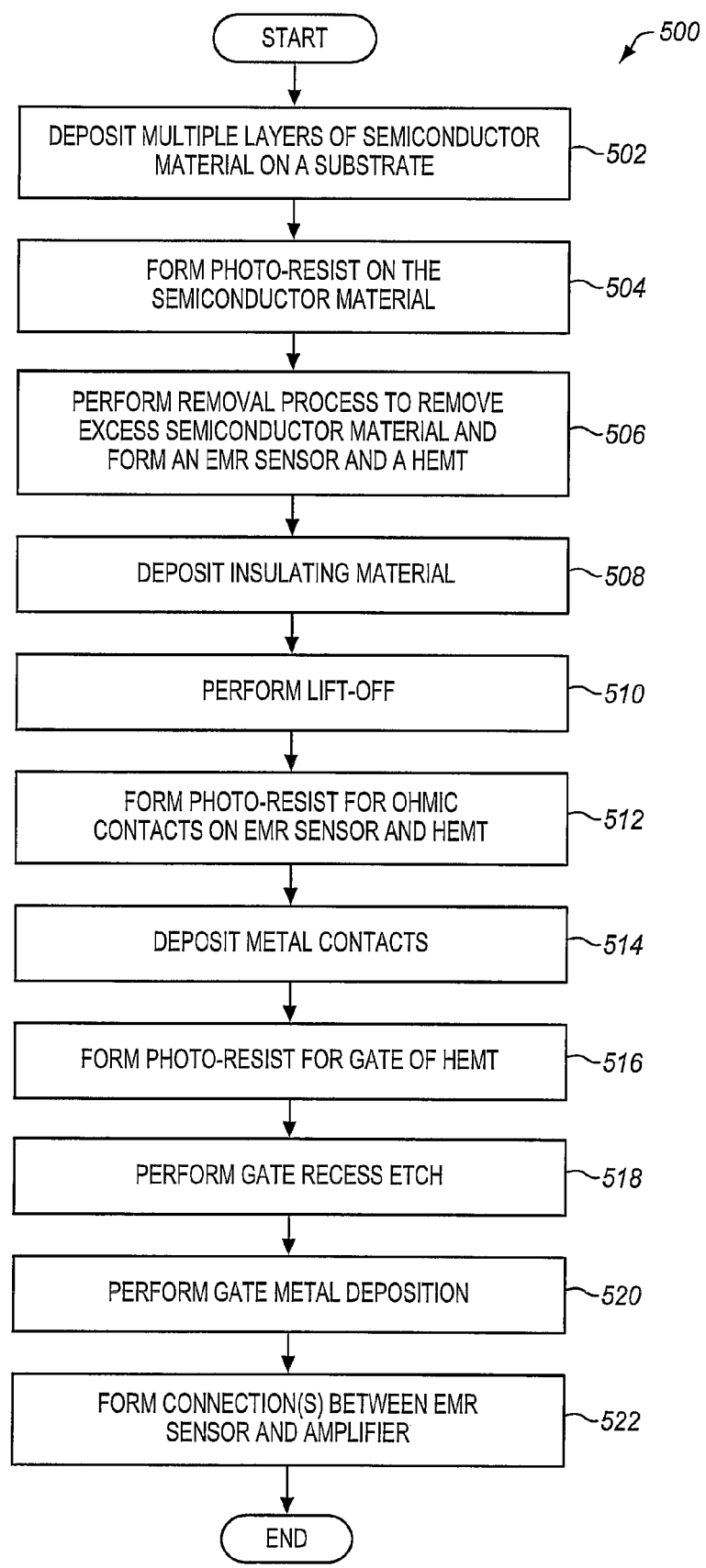
FIG. 5 is a flow chart illustrating an exemplary method of fabricating a magnetic sensing chip that includes an EMR sensor and a HEMT in an exemplary embodiment of the invention.

FIG. 5 is a flow chart illustrating an exemplary method of fabricating a magnetic sensing chip that includes an EMR sensor and a HEMT in an exemplary embodiment of the invention. In contrast to a metal Shottky field effect transistor (MESFET), which has a doped channel and consequently many ionized donors, the channel of a HEMT is undoped and thus exhibits significantly less Coulomb scattering which leads to lower noise, higher mobilities, and faster response.

Although HEMTs will be described in the following using an InAs channel and AlSb barriers, other materials may be employed for the channel and barrier such as $In_xGa_{1-x}As$, GaAs, or InP for the channel. HEMTs utilizing an InAs channel are described in the reference by J. B. Boos et al., entitled "AlSb/InAs HEMT's for low voltage high speed applications", in the reference by C. R. Bolognesi et al., entitled "InAs/AlSb heterostructure field-effect transistors using Si-doped InAs/AlSb short period superlattice modulation doping barrier", and in the reference by J. B. Boos et al., entitled "Ohmic contacts in AlSb/InAs high electron mobility transistors for low voltage operation".

In step 502, multiple layers of semiconductor material are deposited on a semiconductor substrate, such as GaAs. A subset of the semiconductor layers define a quantum well that may comprise a 2DEG or 2DHG.

Figure 6:
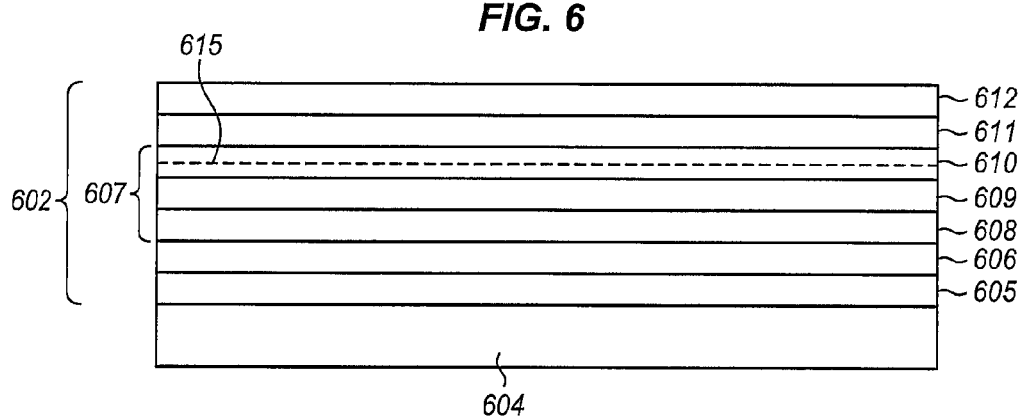
FIG. 6 is a cross-sectional view illustrating multiple semiconductor layers deposited on a substrate in an exemplary embodiment of the invention.

FIG. 6 is a cross-sectional view illustrating the multiple semiconductor layers 602 deposited on the substrate 604. A buffer layer 605, such as AlSb, is deposited on the substrate 604. Buffer layer 605 prevents impurities present in the substrate 604 from migrating into the semiconductor layers deposited above buffer layer 605. In addition, the buffer layer 605 is chosen to accommodate the typically different lattice constants of the substrate 604 and the subsequent functional layers of the EMR sensor and HEMT structure. Buffer layer 605 may be about 2-3 µm thick. Buffer layer 605 may be followed by an etch stop layer 606 that serves as a chemically stable mesa floor for device isolation. Etch stop layer 606 may be a 200 nm thick $Al_xGa_{1-x}Sb$ ($0.7 \leq x \leq 0.8$) layer.

Multiple semiconductor layers are then deposited to form the electron quantum well 607 that may comprise a 2DEG or 2DHG. A first barrier layer 608 of semiconducting material, such as AlSb, is deposited onto the etch stop layer 606 where barrier layer 608 has a first band gap. Barrier layer 608 may be about 500 Å thick. A channel layer 609 of semiconducting material, such as InAs, is deposited on barrier layer 608 forming the channel and having a second band gap smaller than the first band gap. Channel layer 609 may be about 100-150 Å thick. A second barrier layer 610 of semiconducting material, such as AlSb, is deposited on the channel layer 609 where barrier layer 610 has a third band gap greater than the second band gap. Barrier layer 610 may be about 125 Å thick.

A thin layer 615 of n-doped material, such as Si-doped InAs, may be inserted somewhere into barrier layer 610 to supply electrons to the channel (illustrated as a dotted line in FIG. 6). The deposition of second barrier layer 610 is interrupted after depositing the lower part to deposit doped material on top of the lower part of layer 610. The upper part of layer 610 is then deposited. The doped layer may be 5-30 Å thick. Multiple n-doped layers may be inserted into barrier layer 610 to form a multilayer of second barrier material and n-doped material.

A third barrier layer 611, such as $In_xAl_{1-x}As$ ($0.4 \leq x \leq 0.5$), is deposited on barrier layer 610 to enhance the insulating properties of the barrier. Further, barrier layer 611 enables the use of a gate recess etch into the upper barrier material prior to gate metal definition, which otherwise would be prohibited by the high reactivity of AlSb after exposure to air. A capping layer 612 is deposited on barrier layer 611 to protect the other layers from corrosion. Capping layer 612 is formed by a non-corrosive semi-insulating semiconductor, such as InAs. Capping layer 612 may be about 15-50 Å thick.

Figure 7:
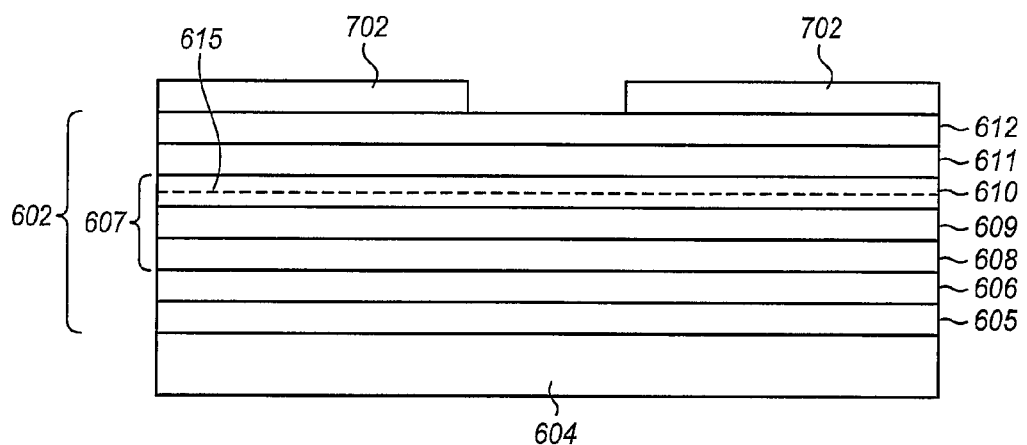
FIG. 7 is a cross-sectional view illustrating photo-resist formed on the semiconductor layers of FIG. 4 in an exemplary embodiment of the invention.

In step 504 of FIG. 5, photo-resist is formed on the semiconductor layers 602 of FIG. 6. FIG. 7 is a cross-sectional view illustrating the photo-resist 702 formed on the semiconductor layers 602. The photo-resist 702 is formed to have a pattern that defines an EMR sensor and a high electron mobility transistor (HEMT). The photo-resist 702 is patterned to form one EMR sensor and one HEMT in FIG. 7, but multiple other EMR sensors and HEMT may be defined by photo-resist 702. Both devices can be fabricated based on the same heterostructure as will be described below. According to the fabrication method outlined below, the EMR sensor and the HEMTs may advantageously be fabricated closer together which produces a magnetic sensing chip with a more compact design and lower electrical noise. The close proximity of the EMR sensor and the HEMT can also reduce the capacitance between the conductors that connect the EMR sensor to the HEMT leading to lower noise and a faster response. Moreover, magnetic sensing chips may also be fabricated more cost effectively by forming both the EMR sensor and the HEMT for amplification in the same fabrication steps.

In step 506 of FIG. 5, a removal process, such as ion milling, RIE, or wet-etching is performed to remove the excess material not protected by the photo-resist 702 down to the etch stop layer 606 in FIG. 7. The remaining material underneath the photo-resist 702 will form an EMR sensor and a HEMT. In step 508 of FIG. 5, insulating material 801 (see FIG. 8), such as Si-oxide or Al-oxide, is deposited in the valleys to electrically insulate the EMR sensor and the HEMT. In step 510 of FIG. 5, lift-off is performed to remove insulating material 801 deposited over the photo-resist 702 defining the mesas of the EMR and HEMT structures in FIG. 7.

Figure 8:
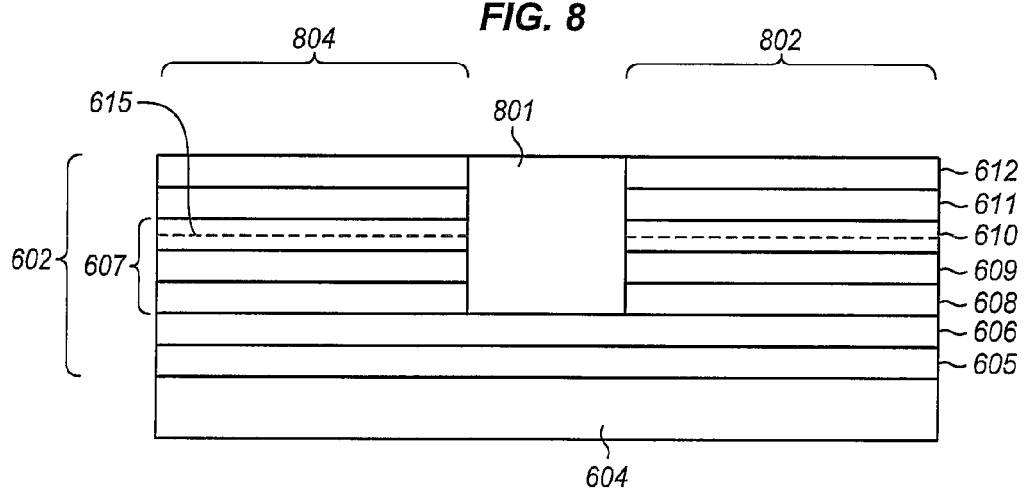
FIG. 8 is a cross-sectional view illustrating an EMR sensor and a HEMT formed on a substrate in an exemplary embodiment of the invention.

FIG. 8 is a cross-sectional view illustrating the EMR mesa 802 and the HEMT mesa 804 formed on substrate 604. EMR sensor 802 and HEMT 804 are advantageously formed in the same fabrication steps with the same semiconductor layers. Both EMR sensor 802 and HEMT 804 include a quantum well structure 607.

In step 512 of FIG. 5, photoresist is deposited and patterned onto the HEMT mesa 804 and EMR mesa 802 of FIG. 8 to define the ohmic contacts for the source and drain of the HEMT, the pair of current and pair of voltage leads for the EMR sensor, and the shunt for the EMR sensor.

In step 514 of FIG. 5, metallic contacts such as AuGe/Ni/Pt/Au or Pd/Pt/Au are deposited for the EMR sensor and the HEMT. The metal deposition is followed by lift-off. Further processing such as rapid thermal annealing may be performed to form the ohmic contacts.

In a further processing step, the Schottky gate metallization is performed on the HEMT. In step 516 of FIG. 5, photo-resist is deposited and patterned on the HEMT to form the gate. The gate is defined for example by using PMMA photo-resist and e-beam photolithography. In step 518 of FIG. 5, a gate recess etch is performed, such as by employing citric acid to remove the cap material and to etch into the third barrier layer 611 or the second barrier layer 610. In step 520 of FIG. 5, gate metal deposition is performed to form the gate of the HEMT from material such as Cr/Au or Ti/Au. The metal deposition is followed by lift-off.

Figure 9:
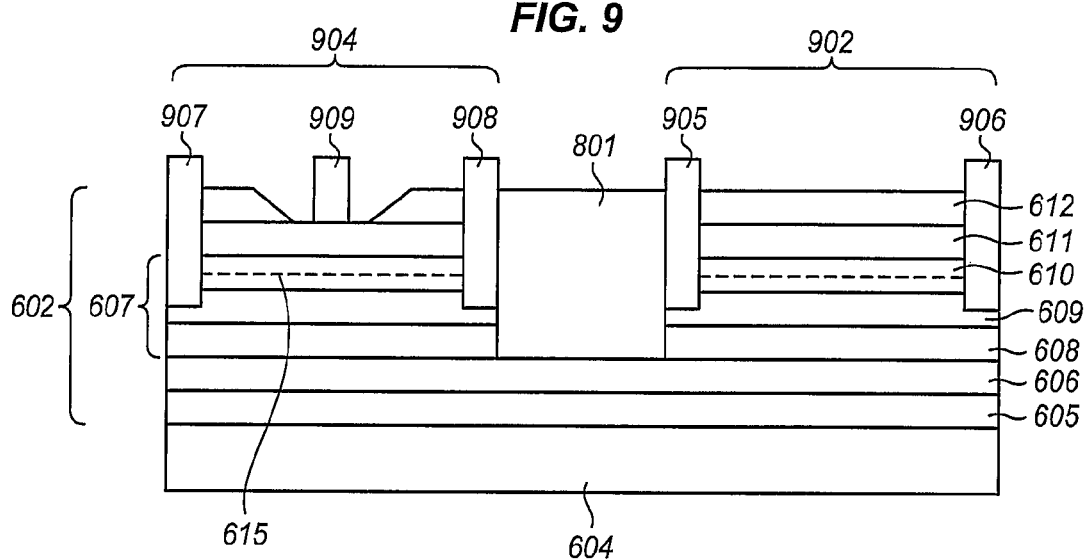
FIG. 9 is a cross-sectional view illustrating the EMR sensor and the HEMT with the conductive material deposited to form leads in an exemplary embodiment of the invention.

FIG. 9 is a cross-sectional view illustrating the EMR sensor 902 and the HEMT 904, which will be part of the signal amplifier circuit, with the conductive material deposited to form leads and shunt of EMR sensor 902 and the source, drain, and gate of HEMT 904. EMR sensor 902 includes a plurality of ohmic contacts for the leads 905 and the shunt 906. Leads 905 typically include two voltage leads and two current leads. The voltage leads and the current leads may be in an IVVI configuration as shown in FIG. 1, or may be in an IVIV configuration.

HEMT 904 also includes ohmic contacts for source 907 and drain 908 and a Schottky metal contact for the gate 909.

In step 522 of FIG. 5, one or more connections are formed between EMR sensor 902 and HEMT 904, which are not illustrated in FIG. 9. When the EMR sensor 902 is in operation, EMR sensor 902 will sense magnetic fields and generate a data signal. For instance, if the EMR sensor 902 is implemented in a magnetic disk drive system, then EMR sensor 902 will sense magnetic transitions on the magnetic disk to generate a data signal. The connections are formed between EMR sensor 902 and HEMT 904, and are connected in a signal amplifier circuit so that the data signal detected by EMR sensor 902 is amplified. In one embodiment, each voltage lead of EMR sensor 902 is connected to the gate contacts 909 of two HEMTs 904, which are connected as a differential amplifier.

According to the above fabrication method, EMR sensor 902 and HEMT 904 of the amplifier may advantageously be fabricated closer together which produces a magnetic sensing chip with a more compact design, lower noise, and faster response. The close proximity of EMR sensor 902 and HEMT 904 can also reduce the capacitance between the conductors that connect EMR sensor 902 to HEMT 904 leading to reduced noise. Moreover, magnetic sensing chips may also be fabricated more cost effectively by forming both EMR sensor 902 and HEMT 904 for signal-amplification in the same fabrication steps.

As is illustrated in FIG. 9, HEMT 904 is fabricated on the same substrate 604 as EMR sensor 902 using the same semiconductor layers. EMR sensor 902 is then connected to one or more HEMTs 904 that is part of a signal amplifier circuit to amplify data signals from EMR sensor 902. The connections between EMR sensor 902 and HEMT 904 can be formed in a desired manner, one example of which is shown in FIG. 10.

Figure 10:
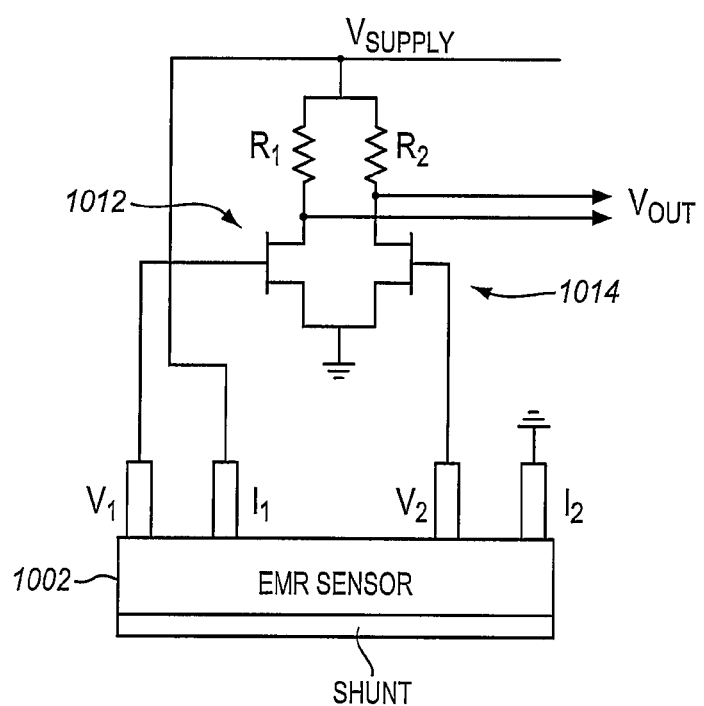
FIG. 10 is a circuit diagram illustrating one way of connecting an EMR sensor to a HEMT in an exemplary embodiment of the invention.

FIG. 10 is a circuit diagram illustrating one way of connecting an EMR sensor to a pair of HEMTs that are part of a differential amplifier in an exemplary embodiment of the invention. In this embodiment, EMR sensor 1002 includes two voltage leads $V_1$ and $V_2$, two current leads $I_1$ and $I_2$, and a shunt. Lead $V_1$ of EMR sensor 1002 is connected to the gate of a first HEMT 1012. Lead $V_2$ of EMR sensor 1002 is connected to the gate of a second HEMT 1014. Lead $I_1$ of EMR sensor 1002 is connected to a supply voltage $V_{supply}$. Lead $I_2$ of EMR sensor 1002 is connected to the ground. The drain of the first HEMT 1012 and the drain of the second HEMT 1014 are connected to supply voltage $V_{supply}$ through resistors $R_1$ and $R_2$, respectively. The source of the first HEMT 1012 and the source of the second HEMT 1014 are connected to ground.

Although the above embodiment comprises a HEMT formed with an EMR sensor, the invention is not limited to a HEMT to provide amplification. Other implementations using different types of transistors are within the scope of the invention.

Figure 11:
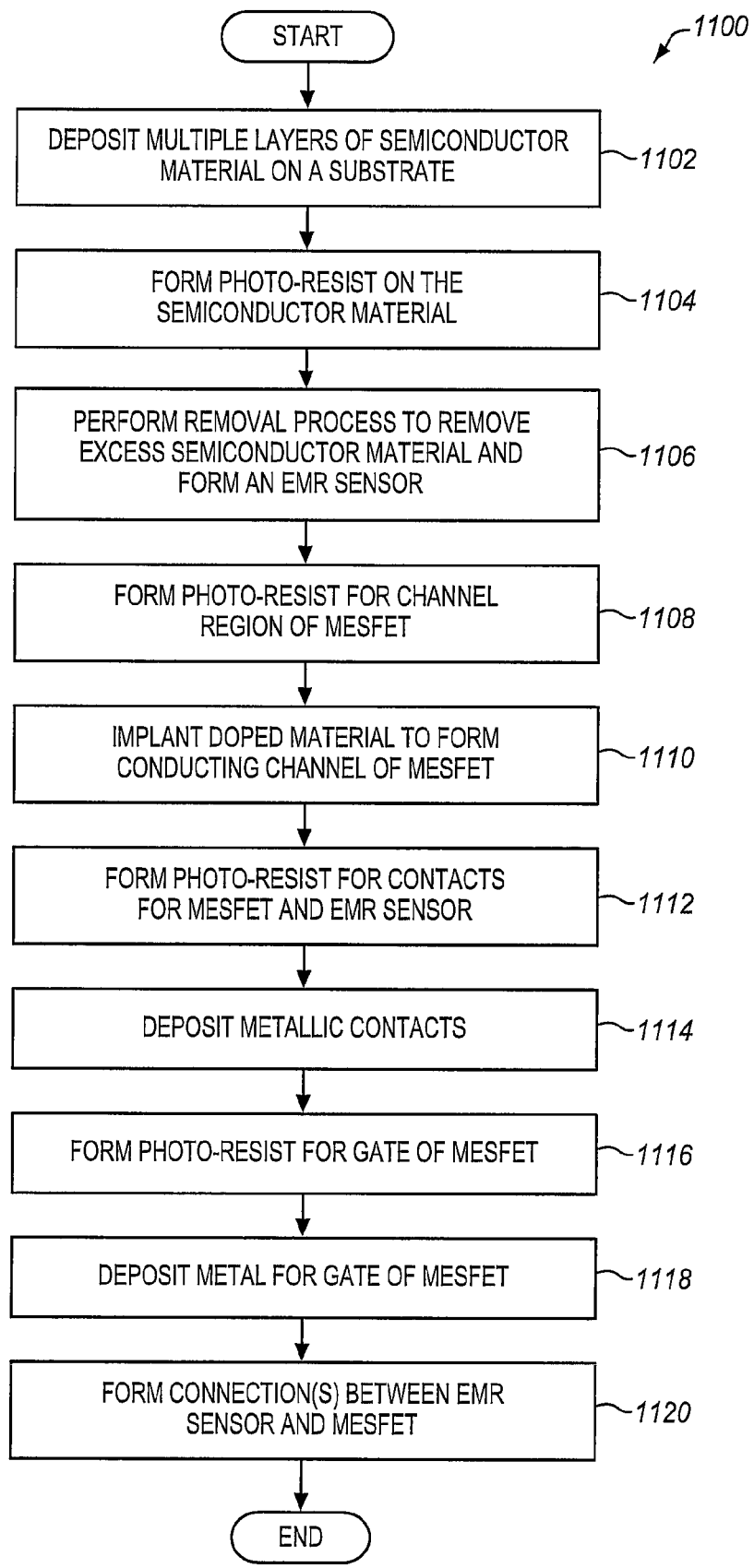
FIG. 11 is a flow chart illustrating an exemplary method of fabricating a magnetic sensing chip that includes an EMR sensor and a MESFET in an exemplary embodiment of the invention.
Figure 12:
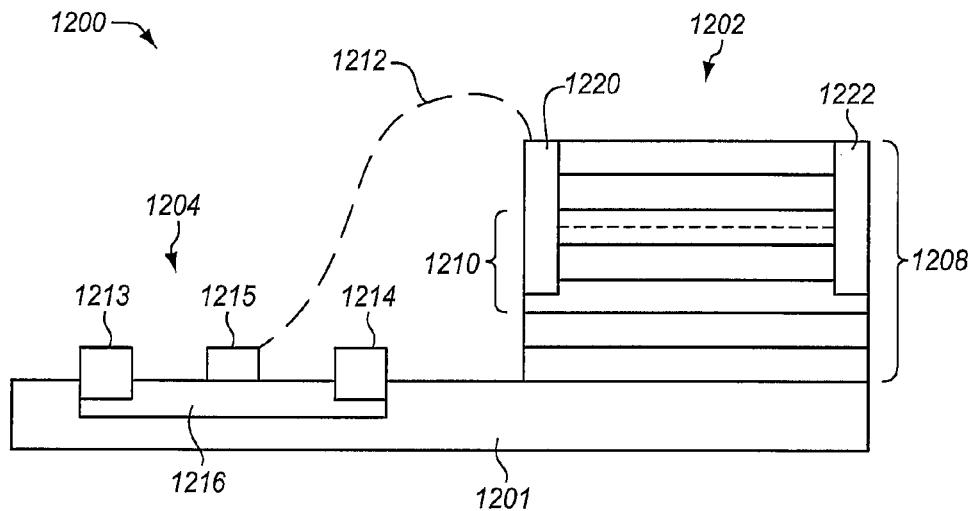
FIG. 12 is a cross-sectional view illustrating an EMR sensor and a MESFET formed on a substrate in an exemplary embodiment of the invention.

EMR Sensor/MESFET Example—FIGS. 11-12

FIGS. 11-12 illustrate the exemplary method of fabricating a magnetic sensing chip that includes an EMR sensor and a metal semiconductor field effect transistor (MESFET) in an exemplary embodiment of the invention. The magnetic sensing chips of the invention may be fabricated according to other methods in other embodiments. FIG. 11 is a flow chart illustrating an exemplary method 1100 of fabricating magnetic sensing chips. In step 1102, multiple layers of semiconductor material are deposited onto a semi-insulating semiconductor substrate, such as GaAs, Si, or Ge for the EMR sensor. One or more of the semiconductor layers define a quantum well that may comprise a 2DEG or 2DHG. In step 1104 of FIG. 11, photo-resist is formed on top of the semiconductor layers. The photo-resist is formed to have a pattern that defines an EMR sensor. In step 1106 of FIG. 11, a removal process, such as ion milling, RIE, or wet-etching is performed to remove the excess material not protected by the photo-resist down to the semi-insulating substrate. The remaining material underneath the photo-resist comprises the mesa for the EMR sensor. Photo-resist is removed subsequently. In step 1108 of FIG. 11, photo-resist is formed on top of the semi-insulating substrate to define the channel region between the source and the drain of the MESFET. In step 1110 of FIG. 11, n-doped or p-doped material is implanted to form the conducting channel. Photo-resist is removed subsequently. In step 1112 of FIG. 11, photo-resist is formed for the contacts of the source and drain of the MESFET, the current and voltage leads of the EMR sensor, and the shunt of the EMR sensor. In step 1114 of FIG. 11, metallic contacts such as AuGe/Ni/Pt/Au or Pd/Pt/Au are deposited for the current and voltage leads and shunt of the EMR sensor, and the source and drain of the MESFET. The metal deposition is followed by lift-off. Further processing such as rapid thermal annealing may be performed to form the ohmic contacts.

In a further processing step, Schottky gate metallization is performed on the MESFET. In step 1116 of FIG. 11, photo-resist is deposited and patterned on the MESFET to form the gate. The gate may be defined by using PMMA photo-resist and e-beam photolithography. In step 1118 of FIG. 11, gate metal deposition is performed to form the gate of the MESFET from material such as Cr/Au or Ti/Au. The metal deposition is followed by lift-off.

In step 1120 of FIG. 11, one or more connections are formed between the EMR sensor and the MESFET. When the EMR sensor is in operation, the EMR sensor will sense magnetic fields and generate a data signal. For instance, if the EMR sensor is implemented in a magnetic disk drive system, then the EMR sensor will sense magnetic transitions on the magnetic disk to generate a data signal. The EMR sensor and the MESFET are connected in a signal amplifier circuit so that the data signal detected by the EMR sensor is amplified. The MESFET thus acts as an amplifier for the EMR sensor.

Those skilled in the art understand that in wafer fabrication with full film depositions, the photo-resist may be formed to have a pattern that defines multiple EMR sensors. If method 1100 is a wafer-level full film deposition, then individual magnetic sensing chips may be cut from the wafer, where an individual magnetic sensing chip may include an EMR sensor connected to one or more MESFET.

FIG. 12 is a cross-sectional view of a magnetic sensing chip 1200 illustrating the EMR sensor 1202 and the MESFET 1204, which will be part of the signal amplifier circuit, formed on a semiconductor substrate 1201. EMR sensor 1202 is formed from multiple semiconductor layers 1208. A subset of the semiconductor layers 1208 in EMR sensor 1202 form a quantum well 1210 comprising a 2DEG or 2DHG. EMR sensor 1202 includes a plurality of ohmic contacts for leads 1220 and the shunt 1222. Leads 1220 typically include two voltage leads and two current leads. The voltage leads and the current leads may be in an IVVI configuration as shown in FIG. 1, or may be in an IVIV configuration.

MESFET 1204 includes a doped channel 1216, includes contacts for source 1213 and drain 1214, and includes a Schottky metal contact for the gate 1215. EMR sensor 1202 and MESFET 1204 are connected in a signal amplifier circuit so that the data signal detected by EMR sensor 1202 is amplified. Connections 1212 are illustrated as a dotted line between EMR sensor 1202 and MESFET 1204 to merely show that the connections 1212 exist. EMR sensor 1202 and MESFET 1204 may be connected in different ways, such as conductive wires, deposited conductive material, etc.

EMR sensor 1202 and MESFET 1204 may advantageously be fabricated closer together which produces a compact design. The close proximity of EMR sensor 1202 and MESFET 1204 can also reduce the capacitance between the conductors 1212 that connect EMR sensor 1202 to MESFET 1204 leading to reduced noise and faster response.

Magnetic sensing chip 1200 may be formed through the fabrication steps of FIG. 11 or may be formed through other fabrication steps. The order of the fabrication steps in FIG. 11 may change. For example, ion-implantation for the channel may be carried out before depositing the multilayer structure for the EMR sensor. The order of the photo-steps may be adjusted accordingly.

In one embodiment, each voltage lead of EMR sensor 12024 is connected to the gate contacts 1215 of two MESFETs 1204, which are connected as a differential amplifier.

The above example is for illustrative purposes only as other types of transistors may be used, such as metal-oxide semiconductor field effect transistors (MOSFETs). All such implementations are within the scope of the invention. Thus, this invention shall not be limited by the type of transistor employed on the same chip as the EMR sensor.

Figure 13:
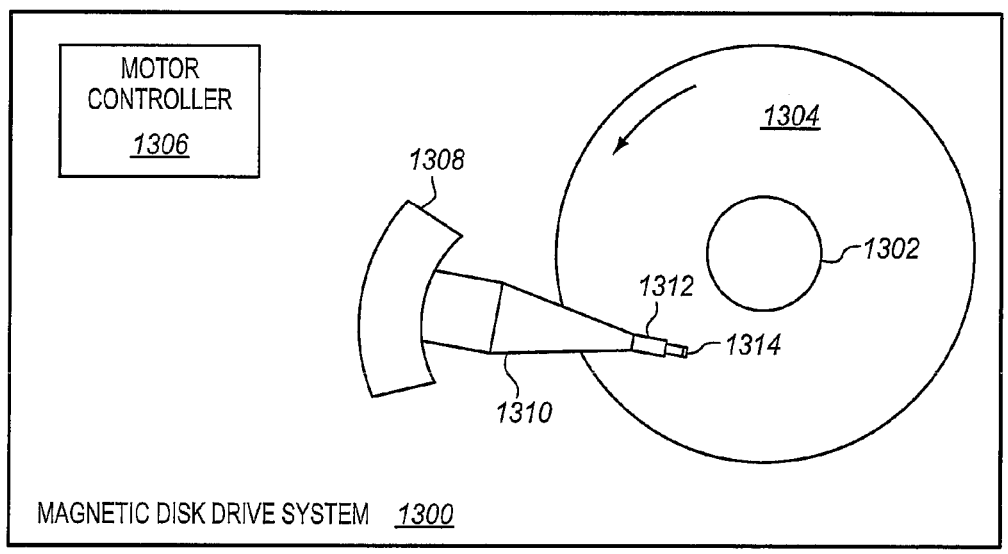
FIG. 13 illustrates a magnetic disk drive system in an exemplary embodiment of the invention.

Magnetic Disk Drive System—FIG. 13

FIG. 13 illustrates a magnetic disk drive system 1300 in an exemplary embodiment of the invention. Magnetic disk drive system 1300 includes a spindle 1302, a magnetic disk 1304, a motor controller 1306, an actuator 1308, an actuator arm 1310, a suspension arm 1312, and a recording head 1314. The recording head 1314 may include an EMR sensing chip as described herein. Spindle 1302 supports and rotates a magnetic disk 1304 in the direction indicated by the arrow. A spindle motor (not shown) rotates spindle 1302 according to control signals from motor controller 1306. Recording head 1314 is supported by suspension arm 1312 and actuator arm 1310. Actuator arm 1310 is connected to actuator 1308 that is configured to rotate in order to position recording head 1314 over a desired track of magnetic disk 1304. Magnetic disk drive system 1300 may include other devices, components, or systems not shown in FIG. 13. For instance, a plurality of magnetic disks, actuators, actuator arms, suspension arms, and recording heads may be used.

When magnetic disk 1304 rotates, an air flow generated by the rotation of magnetic disk 1304 causes an air bearing surface (ABS) of recording head 1314 to ride on a cushion of air a particular height above magnetic disk 1304. The height depends on the shape of the ABS. As recording head 1314 rides on the cushion of air, actuator 1308 moves actuator arm 1310 to position a read element (not shown) and a write element (not shown) in recording head 1314 over selected tracks of magnetic disk 1304.

Although specific embodiments were described herein, the scope of the invention is not limited to those specific embodiments. The scope of the invention is defined by the following claims and any equivalents thereof.

We claim:

1. A magnetic sensing chip adapted to provide magnetic sensing through extraordinary magnetoresistance (EMR), the magnetic sensing chip comprising:
    an EMR sensor comprising a semiconducting heterostructure formed on a substrate;
    at least one transistor comprising a semiconducting heterostructure formed on the substrate from the multiple semiconducting layers; and
    at least one connection between the EMR sensor and the at least one transistor that are connected so that the at least one transistor amplifies data signals from the EMR sensor.

2. The magnetic sensing chip of claim 1 wherein the EMR sensor and the at least one transistor include a two-dimensional electron gas (2DEG).

3. The magnetic sensing chip of claim 1 wherein the EMR sensor and the at least one transistor include a two-dimensional hole gas (2DHG).

4. The magnetic sensing chip of claim 1 wherein the at least one transistor is a high electron mobility transistor (HEMT).

5. A monolithic circuit adapted to provide magnetic sensing through extraordinary magnetoresistance (EMR), the monolithic circuit comprising:
    an EMR sensor formed on a substrate from multiple semiconductor layers, wherein at least one of the semiconductor layers forms a quantum well in the EMR sensor;
    at least one amplifier formed on the substrate from the multiple semiconductor layers, wherein at least one of the semiconductor layers forms a quantum well in the at least one amplifier; and
    at least one connection between the EMR sensor and the at least one amplifier.

6. The monolithic circuit of claim 5 wherein the quantum well in the EMR sensor and in the at least one amplifier comprises a two-dimensional electron gas (2DEG).

7. The monolithic circuit of claim 5 wherein the quantum well in the EMR sensor and in the at least one amplifier comprises a two-dimensional hole gas (2DHG).

8. The monolithic circuit of claim 5 wherein the at least one amplifier comprises a high electron mobility transistor (HEMT).

9. The monolithic circuit of claim 5 wherein the at least one of the semiconductor layers that forms the quantum well is comprised of InAs, InSb, or GaAs.

10. A magnetic sensing chip adapted to provide magnetic sensing through extraordinary magnetoresistance (EMR), the magnetic sensing chip comprising:

an EMR sensor formed on a substrate from multiple semiconductor layers, wherein at least one of the semiconductor layers forms a quantum well in the EMR sensor;

at least one transistor formed on the substrate from the multiple semiconducting layers; and at least one connection between the EMR sensor and the at least one transistor.

11. The magnetic sensing chip of claim 10 wherein the at least one transistor comprises a high electron mobility transistor (HEMT).

12. The magnetic sensing chip of claim 10 wherein the at least one transistor comprises a MESFET.

13. A magnetic disk drive system, comprising:

a magnetic disk; and a recording head that includes a magnetic sensing chip for reading data from the magnetic disk to generate a data signal, the magnetic sensing chip comprises:

an EMR sensor formed on a substrate from multiple semiconductor layers, wherein at least one of the semiconductor layers forms a quantum well in the EMR sensor;

at least one transistor formed on the substrate from the multiple semiconductor layers, wherein at least one of the semiconductor layers forms a quantum well in the at least one transistor; and at least one connection between the EMR sensor and the at least one transistor that are connected so that the at least one transistor amplifies the data signal from the EMR sensor.

14. The magnetic disk drive system of claim 13 wherein the quantum well in the EMR sensor and in the at least one transistor comprises a two-dimensional electron gas (2DEG).

15. The magnetic disk drive system of claim 13 wherein the quantum well in the EMR sensor and in the at least one transistor comprises a two-dimensional hole gas (2DHG).

16. The magnetic disk drive system of claim 13 wherein the at least one transistor comprises a high electron mobility transistor (HEMT).

* * * * *